United States Patent [19]

Miyahara

[11] Patent Number: 5,473,534
[45] Date of Patent: Dec. 5, 1995

[54] DETERMINING FEEDBACK GAIN

[75] Inventor: Shunji Miyahara, Toyota, Japan

[73] Assignee: Toyota Jidosha Kabushiki Kaisha, Toyota, Japan

[21] Appl. No.: 340,685

[22] Filed: Nov. 16, 1994

[30] Foreign Application Priority Data

Dec. 3, 1993 [JP] Japan ................................. 5-303990

[51] Int. Cl.$^6$ ................................................. G05B 13/02
[52] U.S. Cl. ........................... 364/157; 364/152; 364/162
[58] Field of Search ...................................... 364/148, 152,
364/157, 160–165, 424.01, 424.02; 318/609,
610, 611, 561

[56] References Cited

U.S. PATENT DOCUMENTS

| | | | |
|---|---|---|---|
| 4,481,567 | 11/1984 | Kaya et al. | 364/157 |
| 4,785,780 | 11/1988 | Kawai | 364/157 |
| 5,191,272 | 3/1993 | Torii et al. | 318/609 |
| 5,347,447 | 9/1994 | Kiji et al. | 364/157 |

FOREIGN PATENT DOCUMENTS 354601A  3/1991  Japan .

OTHER PUBLICATIONS

Transactions of the A.S.M.E., vol. 64 (Nov. 1942), J. G. Ziegler and N. B. Nichols, pp. 759–768.

*Primary Examiner*—Tan V. Mai
*Assistant Examiner*—Thomas E. Brown
*Attorney, Agent, or Firm*—Kenyon & Kenyon

[57] ABSTRACT

A feedback gain determination method permits optimum values of such feedback gains as P, I and D gains to be determined easily, quickly, reliably, and irrespective of the kind of the subject of control. The method comprises a first step of provisionally determining a predetermined value of a feedback gain, a second step of executing feedback control by using the provisionally determined feedback gain, a third step of determining an error between a designated value and an actual value of the subject of control during the execution of the second step, a fourth step of calculating an evaluation value indicative of the character of feedback control according to the error detected in the third step, a fifth step of executing the second to fourth steps repeatedly a plurality of times after provisionally determining a new feedback value different from the previous value, and a sixth step of calculating a feedback gain value which provides for a suitable evaluation value according to the relation between the feedback gain value and the evaluation value obtained through the execution of the fifth step. The method permits easy and quick determination of the proper value of the gain.

5 Claims, 12 Drawing Sheets $$LR = \frac{\sum_{i=1}^{n} \sqrt{\Delta T_i^2 + \Delta V_i^2}}{C_E - C_S} \quad \text{------(1)}$$

$$S_{vv} = C \int_{C_S}^{C_E} \varepsilon(t)dt = C \sum_{i=1}^{n} V_i \quad \text{-----(2)}$$

$$\left(C = \frac{30}{C_E - C_S}\right)$$

$$A_{sv} = C \int_{C_S}^{C_E} |\varepsilon(t)|dt = C \sum_{i=1}^{n} |V_i| \quad \text{------(3)}$$

DETERMINING FEEDBACK GAIN

BACKGROUND OF THE INVENTION

1. Field of the Invention

This invention relates to a technique of easily and quickly determining the optimum value of feedback gain used for calculating correction amount in feedback control.

2. Description of the Prior Art

Feedback control is frequently adopted for, for instance, moving an automatic guidance vehicle along a predetermined course. The control comprises a step of detecting a deviation or error $\Delta E$ from the course, a step of calculating correction amount according to the detected error $\Delta E$, and a step of correcting the steering angle of the vehicle according to the calculated correction amount, these steps being executed repeatedly.

Generally, in the feedback control, the correction amount is calculated in any of the following ways:

P system: A value ($P\times\Delta E$) which is proportional to the error is used as the correction amount.

PI system: The sum of a value proportional to the error and a value proportional to an integral of the error ($P\times\Delta E+I\times$integral of $\Delta E$) is used as the correction amount.

PD system: The sum of a value proportional to the error and a value proportional to a differential of the error ($P\times\Delta E+D\times$differential of $\Delta E$) is used as the correction amount.

PID system: The sum of a value proportional to the error, a value proportional to an integral of the error and a value proportional to a differential of the error ($P\times\Delta E+I\times$integral of $\Delta E+D\times$differential of $\Delta E$) is used as the correction amount.

The factors P, I and D as used in the above formula are feedback gains. Specifically, the P gain is a proportional gain, the I gain is an integral gain, and the D gain is a differential gain. The values of the feedback gains such as the P, I and D gains have great influence on the feedback control characteristics. For example, if the P or proportional gain is too small in value, the correction of the running course of the automatic guidance vehicle is delayed. If the gain is too large, on the other hand, the running course meanders greatly.

Accordingly, on-site processes have heretofore been contemplated, which permit the optimum value of feedback gain to be found out easily and in a short period of time. A typical one of such processes is a limit sensitivity process which is disclosed in ASME trans., vol. 64, (1942. 11.), J. G. Ziegler, N. B. Nichols, pp. 759–768.

In this limit sensitivity process, the magnitude of the P gain with which the error is undergoing self-sustaining vibration is obtained by carrying out actual feedback control on the subject of control, and the optimum value of each gain is determined from the value of the P gain at this time in accordance with experiment rules.

Specifically, the I and D gains are set to zero, that is, the sole P gain is made variable in a trial feedback control, and the P gain is increased gradually. When the self-sustaining vibration of the error is obtained, the P, I and D gains are set to be, for instance:

P gain$=0.6\times P_c$

I gain$=0.5\times\tau_c$

D gain$=0.125\times\tau_c$ where $P_c$ is the value of the P gain at this time and $\tau_c$ is the period of the self-sustaining vibration.

In these formulas, the individual coefficients are obtained experimentally, and their adequacy empirically verified. In this way, the values of the P, I and D gains are determined.

In the limit sensitivity process, however, problems are encountered in the practical way of detecting the self-sustaining vibration. Besides, depending on the subject of control, there may be cases when it is difficult to detect the reaching of the state of the self-sustaining vibration.

As an example, in the feedback control for moving an automatic guidance vehicle (hereinafter referred to as AGV) along a course, it is not easy to accurately determine the instant of reaching of the self-sustaining vibration because of very slow changes in the course of the AGV.

SUMMARY OF THE INVENTION

An object of the invention is to provide a method of determining feedback gain which permits determining the proper value of feedback gain both easily and accurately, in a short period of time and irrespective of the kind of the subject of control.

The method of determining feedback gain according to the invention, as schematically shown in FIG. 1, comprises a first step of provisionally determining a predetermined value of a feedback gain, a second step of executing feedback control by using the provisionally determined feedback gain, a third step of detecting an error between a designated value and an actual value of the subject of control during the execution of the second step, a fourth step of calculating an evaluation value indicative of the character of feedback control according to the error detected in the third step, a fifth step of executing the second to fourth steps repeatedly a plurality of times after provisionally determining a new feedback gain value different from the previous value, and a sixth step of calculating a feedback gain value which can provide for a suitable evaluation value according to the relation between the feedback gain value and the evaluation value obtained through the execution of the fifth step.

This method permits a feedback gain providing for a suitable evaluation value to be calculated on the basis of the relation between feedback gain value and evaluation value, and it is thus possible to determine a feedback gain which can realize a suitable feedback control characteristic quickly and reliably.

Particularly, in case of determining the proportional gain, in the fourth step, the ratio between the length of a curve obtained by plotting the error against time axis and the length of the time axis is calculated as the evaluation value, and in the sixth step, a feedback gain value providing for the minimum evaluation value is calculated.

The proportional gain is a factor which influences the stability of control. The stability of control can be evaluated from the extent of variations of the error, and thus the length of the curve obtained by plotting the error against time axis is suited for evaluating the proportional gain. Thus, by using the length of the curve obtained by plotting the error against time axis as the evaluation value, it is possible to obtain quickly and accurately a value of the proportional gain that provides for the optimum stability.

In case of determining the integral gain, in the fourth step, the evaluation value is calculated by integrating the error, and in the sixth step, a value of feedback gain that provides for an evaluation value closest to zero is calculated.

The integral gain is a factor influencing the accuracy of control. The integral of the error reflects the accuracy of control, and is thus suited for evaluating the integral gain.

Thus, by using the integral of the error, it is possible to obtain quickly and accurately a value of integral gain which provides for satisfactory accuracy.

In case of determining the differential gain, in the fourth step, the evaluation value is calculated by integrating the absolute value of the error, and in the sixth step, a value of feedback gain providing for the evaluation value which is closest to zero is calculated.

The differential gain is a factor influencing the response of control. The response of control can be evaluated to the fineness of error variations, and thus the integral of the absolute value of the error is suited for evaluating the differential gain. Thus, by using the integral of the absolute value of the error, it is possible to obtain quickly and accurately a value of differential gain providing for the optimum stability and response.

The present invention will be more fully understood from the following detailed description and appended claims when taken with the accompanying drawings.

DETAILED DESCRIPTION OF THE PREFERRED EMBODIMENTS

First Embodiment

Now, a first embodiment of the invention will be described with reference to FIGS. 2 to 11. In this embodiment, the method of feedback gain determination is applied to the running control of an AGV.

Figure 1:
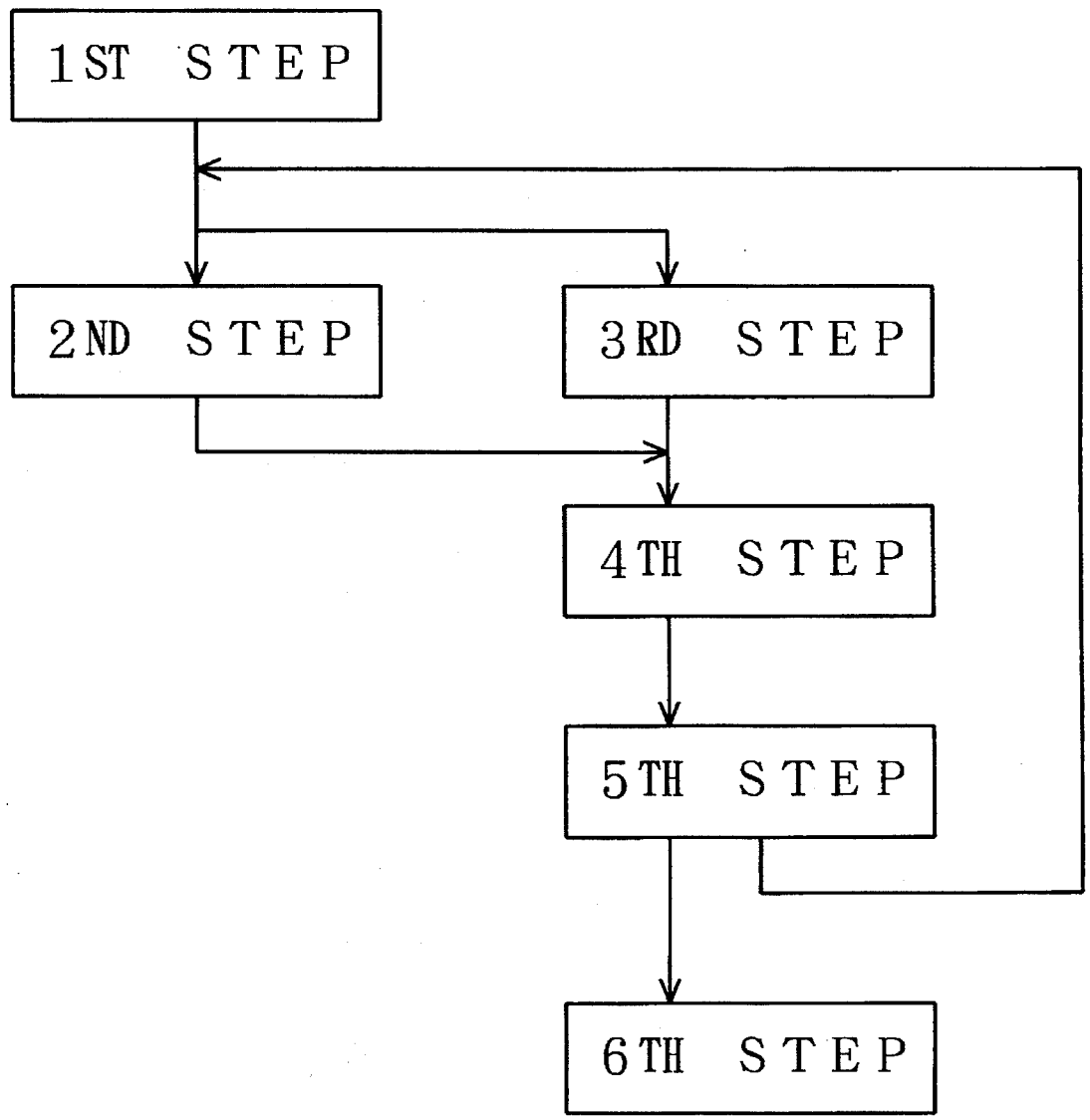
FIG. 1 is a schematic view illustrating the method of determining feedback gain according to the invention.
Figure 2:
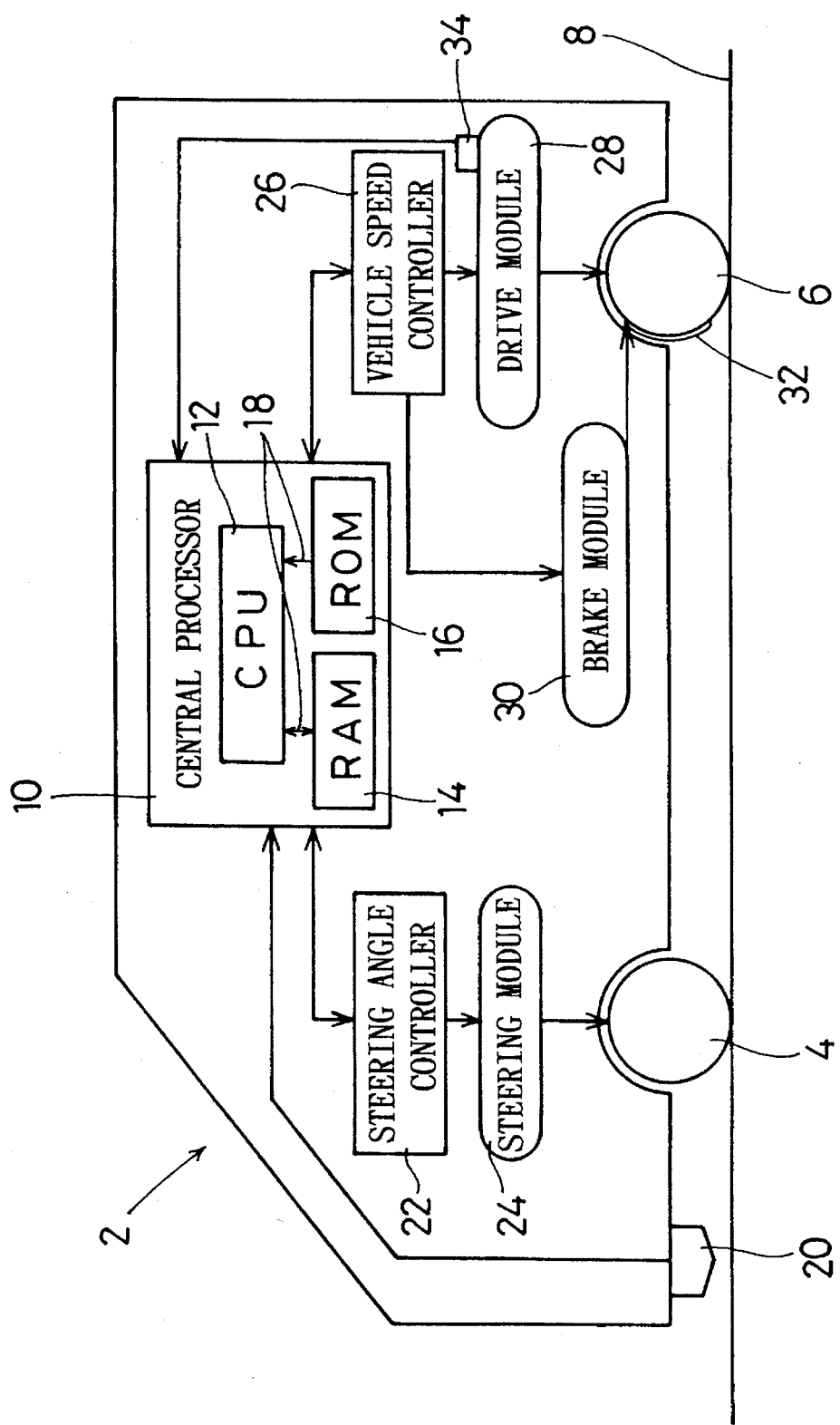
FIG. 2 is a schematic representation of an automatic guidance vehicle used in the method of determining feedback gain according to a first and a second embodiment of the invention.

First, the construction of the AGV in this embodiment will be described with reference to FIG. 2. FIG. 2 is a view showing the construction of an AGV 2 in this embodiment. As shown in FIG. 2, the AGV 2 runs along a running surface 8 with front wheels 4 as steering wheels and rear wheels 6 as drive wheels. A steering module 24 is provided for the steering wheels 4. The drive wheels 6 have brakes 32, and a drive module 28 and a brake module 30 are provided for the drive wheels 6. The steering module 24 is controlled by a steering angle controller 22, and the drive module 28 and brake module 30 are controlled by a vehicle speed controller 26. The steering angle controller 22 and the vehicle speed controller 26 are controlled by a central processor 10. The central processor 10 is a computer system including a central processing unit (CPU) 12, and a memory section having a ROM 14 and a RAM 16. The CPU 12, RAM 14 and ROM 16 are interconnected by data buses 18 for mutual data transfer.

Figure 3:
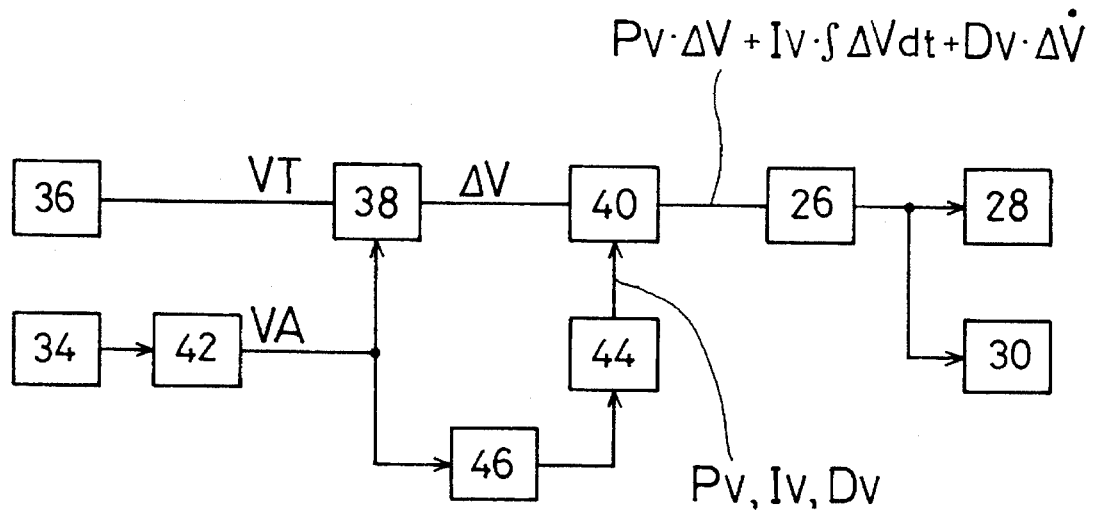
FIG. 3 is a block diagram showing controllers of the automatic guidance vehicle used in the method of determining feedback gain according to the first and the second embodiments.
Figure 3:
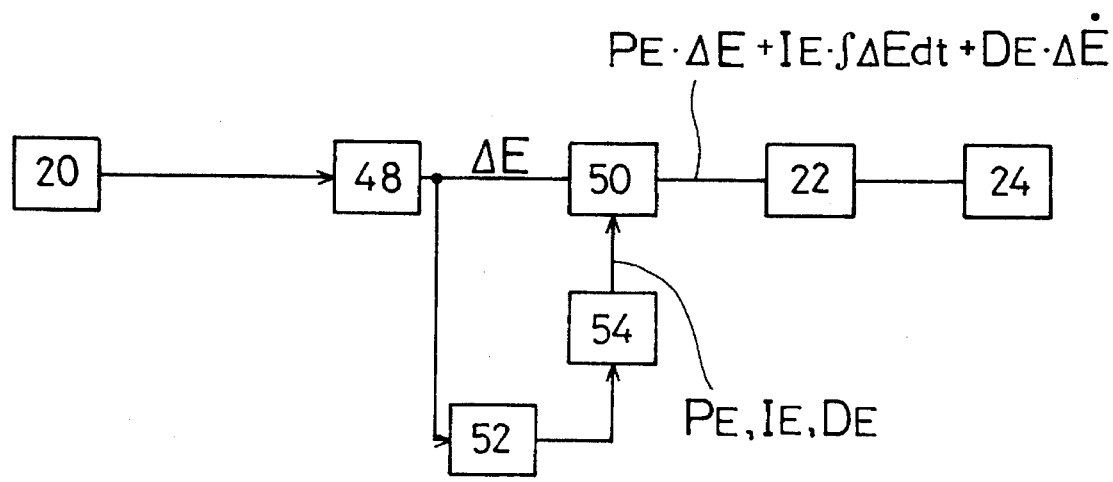

The underside of a central portion of the front end of the AGV 2 is provided with a lateral deviation detector 20. The lateral deviation detector 20 includes a sensor having a pick-up coil, and it detects by electromagnetic induction an induction wire which is laid on a running surface 8 along the running course of the AGV 2. The distance between the induction wire and the lateral deviation detector 20, i.e., the lateral deviation of the AGV 2, is detected from the magnitude of a detection signal output from the detector 20. The direction or sense of deviation, i.e., whether the AGV 2 is deviated to the left or right, is detected from the sign (either positive or negative) of the detection signal. The detection signal from the lateral deviation detector 20 is inputted to the central processor 10. The drive module 28 includes a vehicle speed detector 34, and a vehicle speed signal therefrom is inputted to the central processor 10. The central processor 10 executes a predetermined calculation process according to the inputted signals noted above. According to the result of the calculation process, the central processor 10 outputs a control signal to the steering angle controller 22 and the vehicle speed controller 26. The flow of a signal in the running control system for the AGV 2 will now be described in detail with reference to FIG. 3. FIG. 3 is a block diagram showing the running control system for the AGV 2.

Referring to FIG. 3, designated at 34 is the vehicle speed detector which is provided in the AGV 2. A vehicle speed calculator 42 calculates the actual vehicle speed VA according to a signal from the vehicle speed detector 34. Designated at 36 is a vehicle speed designator, and at 38 an error calculator for calculating the error ΔV between a designated vehicle speed VT and the actual vehicle speed VA. Designated at 44 is a feedback gain storage in which feedback gains $P_V$, $I_V$ and $D_V$ are stored. Designated at 40 is a correction amount calculator for calculating the vehicle speed correction amount from the error ΔV and feedback gains $P_V$, $I_V$ and $D_V$. The correction amount thus calculated is fed to the vehicle speed controller 26, which in turn controls the drive module 28 and the brake module 30. Thus, the actual vehicle speed VA is feedback controlled to be equal to the designated vehicle speed VT. Designated at 46 is a feedback gain controller for controlling the feedback gain to a proper value in the manner as will be described later.

Designated at 48 is an error calculator for calculating the deviation or error a ΔE according to a signal from the lateral deviation detector 20. Designated at 54 is a feedback gain storage in which feedback gains $P_E$, $I_E$ and $D_E$ are stored. Designated at 50 is a correction amount calculator for calculating the steering angle correction amount from the error $\Delta E$ and the feedback gains $P_E$, $I_E$ and $D_E$. The correction amount thus calculated is fed to the steering angle controller 22, which thus controls the steering module 24. Thus, the steering module 24 is feedback controlled such as to reduce the lateral deviation $\Delta E$ to zero. Designated at 52 is a feedback gain controller for controlling the feedback gain to a proper value in the manner as will be described later.

In the running control system having the above constitution for controlling the running of the AGV 2, feedback control (or PID control) is carried out, which involves processes concerning the P (proportional), I (Integral) and D (differential) gains. In this PID control, the methods of determining the optimum values of the P, I and D gains will now be described with reference to FIGS. 4 to 7.

Figures 4A, 4B, 4C, 4D:
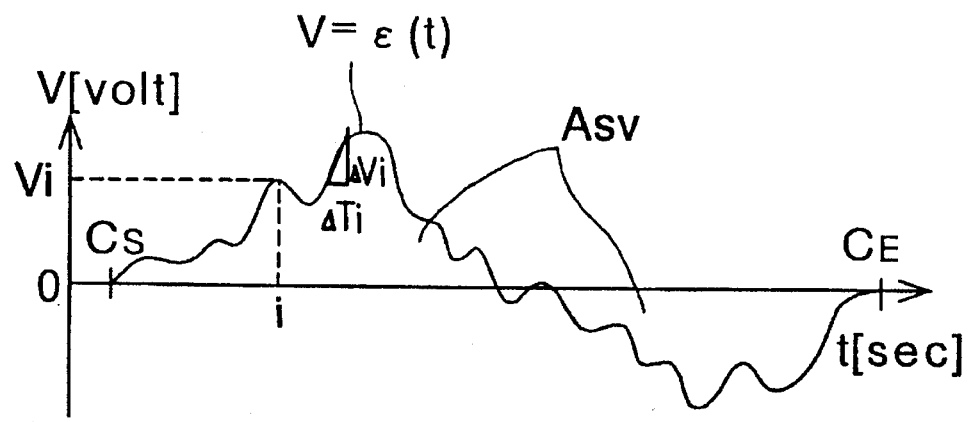
FIG. 4 is a view showing the amount of control and evaluation functions in the method of determining feedback gain according to the first and the second embodiments.

As noted before, during the running of the AGV 2, a detection signal is outputted, which corresponds to the extent and direction of the deviation of the lateral deviation detector 20 from the induction wire which is laid along the running course. FIG. 4 shows an example of the detection signal. In FIG. 4, the ordinate is taken for the voltage value V of the detection signal from the lateral deviation detector 20, and the abscissa is taken for the running time of the AGV 2. The sign of the voltage value V indicates the direction (i.e., to the left or right) in which the lateral deviation detector 20 is deviated with respect to the induction wire. The voltage value V thus corresponds to the error.

When the AGV 2 is running accurately along the induction wire, the voltage value of the detection signal is zero. In the running control of the AGV 2, it is thus necessary the curve $\epsilon(t)$ which represents the voltage value V plotted along the running time to be in as accord as the abscissa axis as possible. In addition, it is necessary to determine the optimum values of the P, I and D gains such that the result of control obtained satisfies all of the stability, accuracy and response.

The P gain governs the stability of control, the I gain is a factor which influences the magnitude of off-set, i.e., the accuracy of control, and the D gain governs the response of control. Thus, in this embodiment, evaluation values are introduced about the individual P, I and D gains having the above characters for accurately evaluating the influence of the value of each gain on the voltage curve $\epsilon(t)$.

Functions LR, Svv and Asv shown by formulas (1) to (3) in FIG. 4 give the evaluation values. In other words, the functions LR, Svv and Asv are evaluation functions for the P, I and D gains, respectively. The meaning of these functions will now be described with reference to FIG. 4.

The function LR, as shown by the formula (1) in FIG. 4, represents the ratio between the length of the voltage curve $\epsilon(t)$ drawn in a measurement time (from instant $C_S$ till instant $C_E$) and the measurement time $(C_E-C_S)$. Thus, LR=1 is obtained in the ideal state of control. The stability of the running control can be evaluated from the extent of lateral deviations of the AGV 2. Thus, the evaluation function LR is suited for evaluating the relation between the stability of control and the P gain. The optimum value of the P gain can be obtained by controlling the P gain such that the function LR approaches the ideal value of unity.

The function Svv, as shown by the formula (2) in FIG. 4, represents the product per 30 seconds of the summation of the measured voltage Vi in the measured time $(C_S-C_E)$ and constant C. The magnitude and sign of the integral of the measured voltage Vi directly reflect the magnitude and sign of the off-set of the error, and it is thus suited for evaluating the I gain. The ideal value of the function Svv is zero, and the optimum value of the I gain is obtained by controlling the I gain such that Svv approaches zero.

The function Asv, as shown by the formula (3) in FIG. 4, represents the product per 30 seconds of the summation of the absolute value of the measured voltage Vi in the measured time $(C_E-C_S)$ and constant C. Its magnitude corresponds to the area enclosed by the voltage curve $\epsilon(t)$ and the abscissa shown in FIG. 4. The response of the running control can be evaluated from the fineness of the lateral deviations of the AVG, i.e., the fineness of the waveform of the curve $\epsilon(t)$ in FIG. 4. Thus, the function Asv is suited for evaluating the D gain which concerns the response of the running control. The response of control is the better the closer the value of Asv is to zero, and the optimum value of the D gain can be obtained by controlling the D gain such that Asv approaches zero.

As shown, the evaluation functions are suited for evaluating the optimum values of the P, I and D gains. Besides, the evaluation functions have an advantage that by using them, the optimum value, of each gain can be obtained accurately irrespective of the settings of the other two gains. It is thus possible to very readily determine the optimum values of the P, I and D gains without using any of very complicated multiple variable analytic processes such as a linear plan process which have been required for obtaining optimum values of a plurality of mutually related functions.

Figure 5:
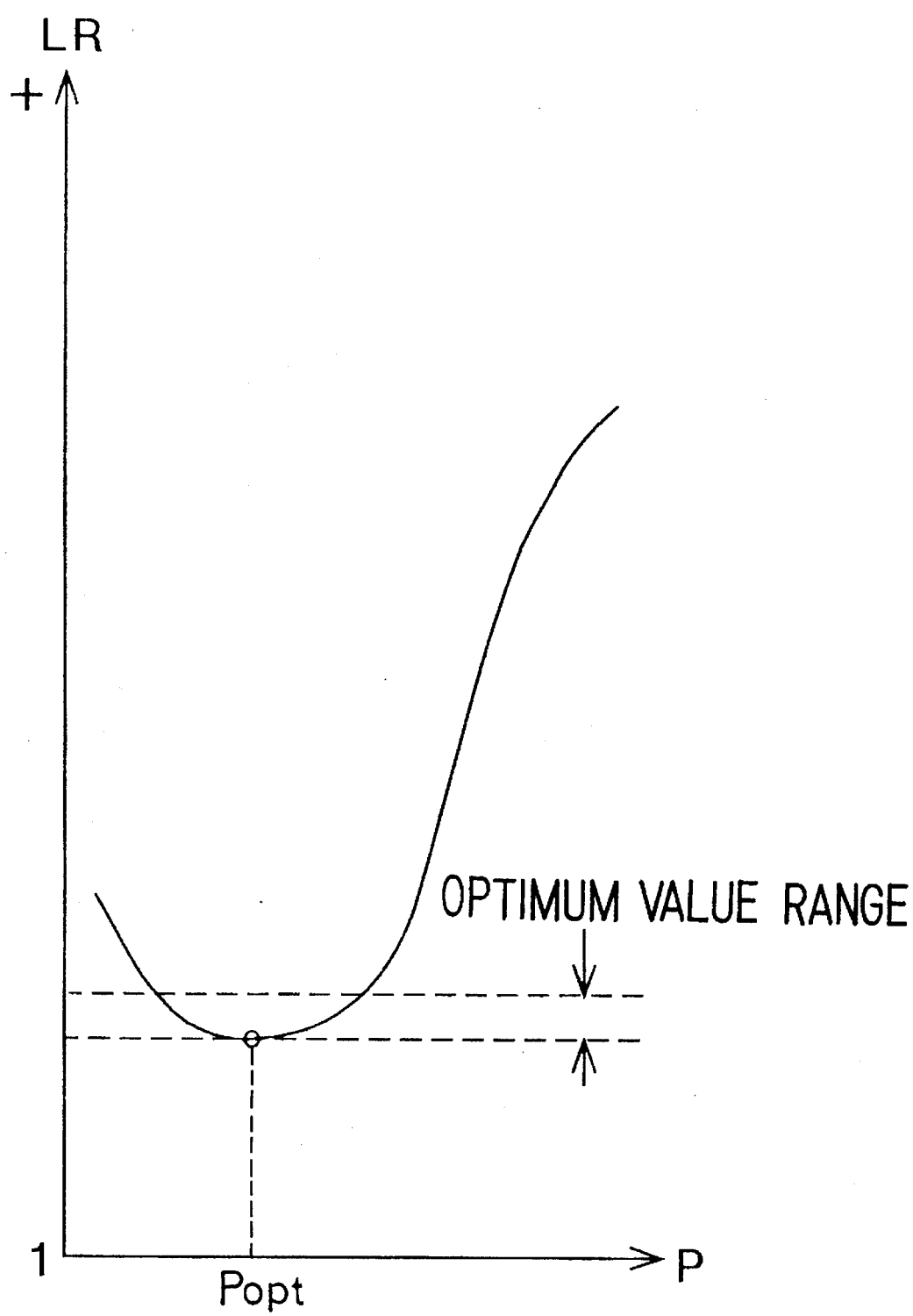
FIG. 5 is a graph showing a proportional gain evaluation function in the method of determining feedback gain according to the first and the second embodiments.

Now, how the evaluation functions change with gain changes will be described with reference to FIGS. 5 to 7. FIG. 5 shows the function LR plotted against the P gain, FIG. 6 shows the function Svv plotted against the I gain, and FIG. 7 shows the function Asv plotted against the D gain.

The function LR, as shown in FIG. 5, draws a downward convex curve with changes in the P gain and is closest to the ideal value of unity at its minimum point. Thus, the value $P_{opt}$ of the P gain corresponding to the minimum point of the curve in FIG. 5 is the optimum value of the P gain.

Figure 6:
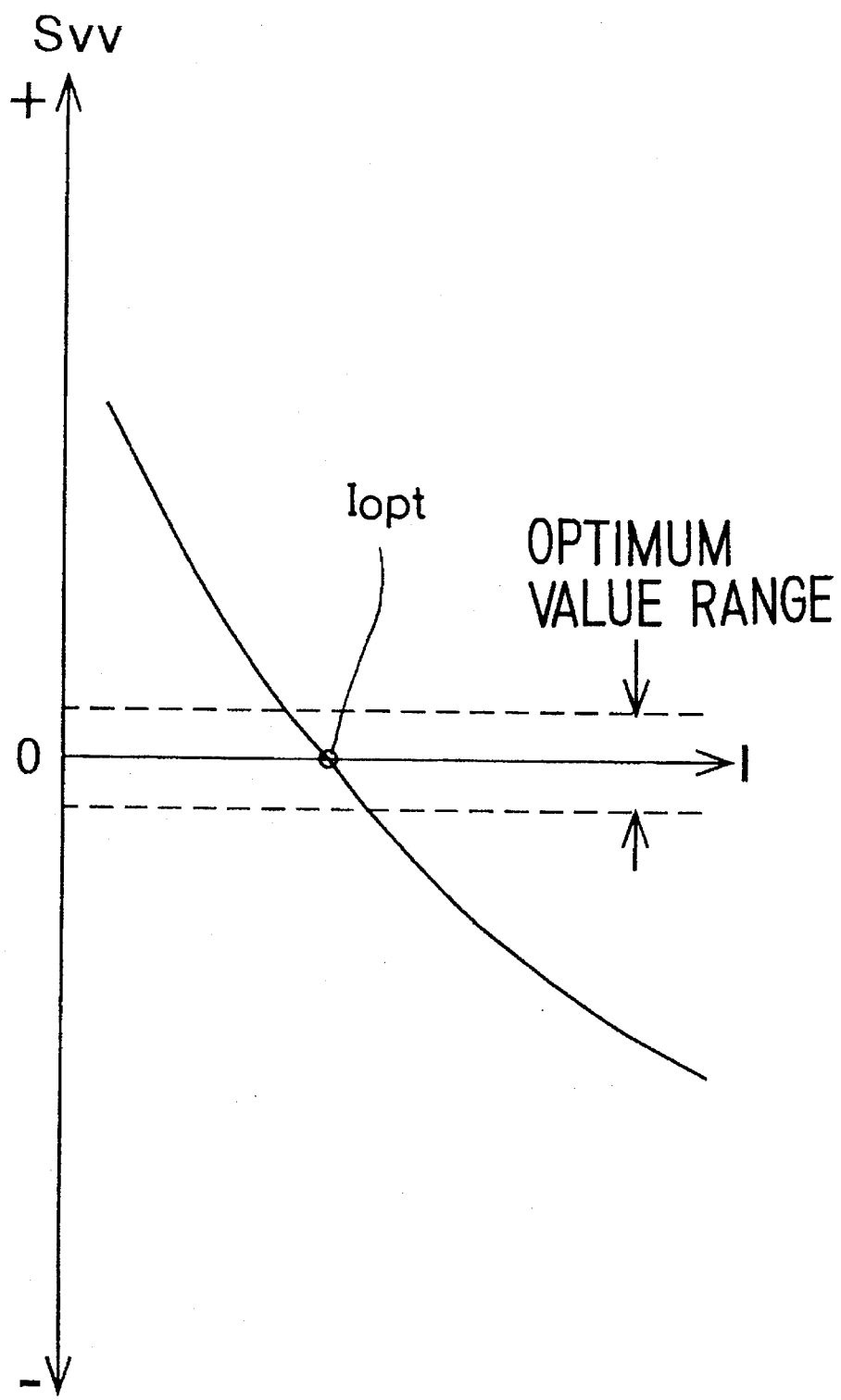
FIG. 6 is a graph showing an integral gain evaluation function in the method of determining feedback gain according to the first and the second embodiments.

The function Svv, as shown in FIG. 6, is reduced uniformly as the I gain is increased and is zero at a certain point. Thus, the value $I_{opt}$ of the I gain corresponding to Svv=0 in the curve shown in FIG. 6 is the maximum value of the I gain.

Figure 7:
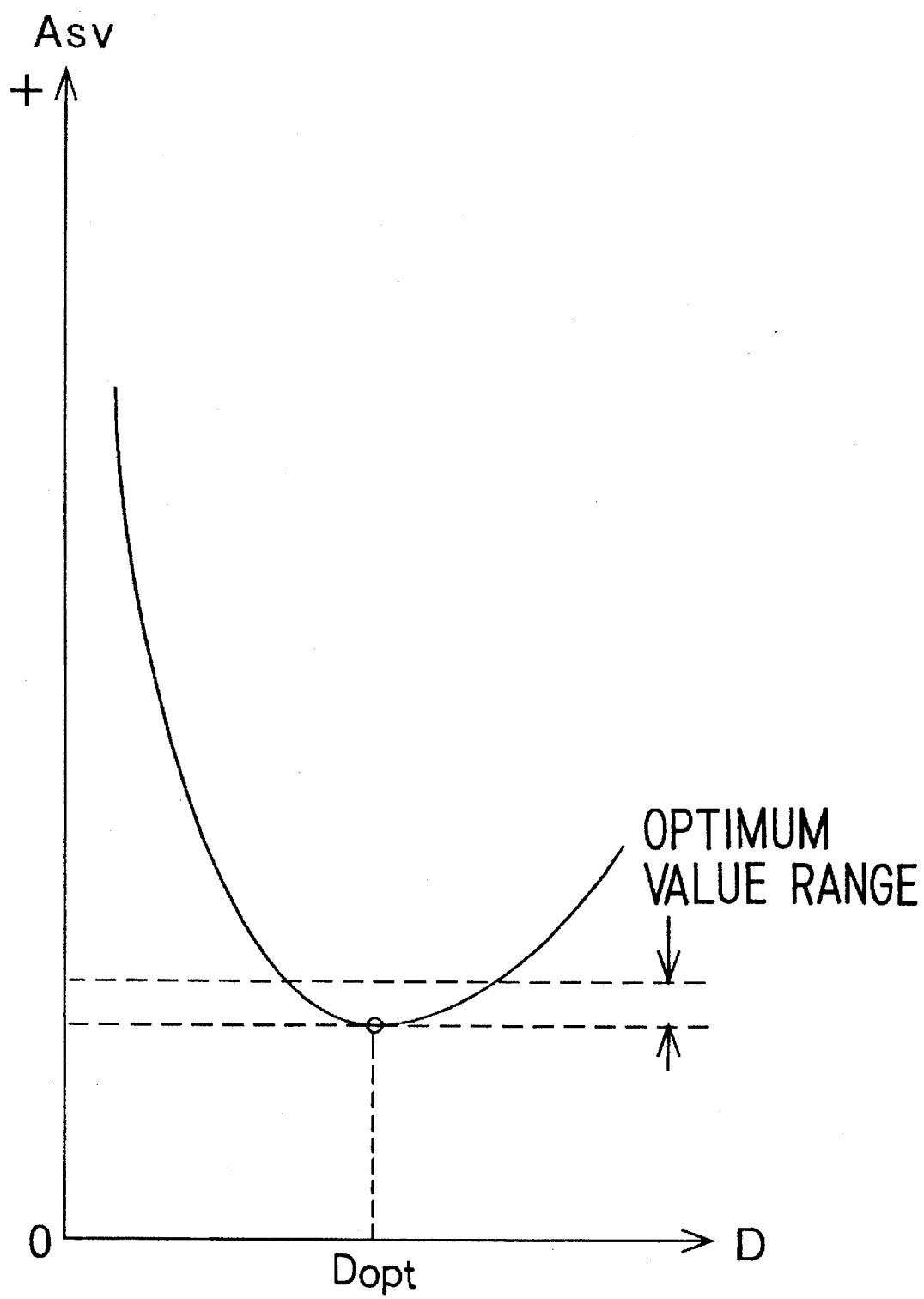
FIG. 7 is a graph showing a differential gain evaluation function in the method of determining feedback gain according to the first and the second embodiments.

The function Asv, as shown in FIG. 7, draws a downward convex curve with changes in the D gain and is closest to the ideal value of zero at its minimum point. Thus, the value $D_{opt}$ of the D gain corresponding to the minimum point of the curve shown in FIG. 7 is the optimum value of the D gain.

There are two different conceivable methods of obtaining the ideal values of gains from evaluation function data. In one of these methods, as shown in FIGS. 5 to 7, a fixed range with respect to the ideal value of each evaluation function is set as an optimum value range, and the value of gain when the value of the evaluation function enters this optimum value range is selected as the optimum value.

In the other method, the optimum values $P_{opt}$, $I_{opt}$ and $D_{opt}$ are calculated by function interpolation. More specifically, a plurality of evaluation function values are obtained such that they sandwich the optimum values $P_{opt}$, $I_{opt}$ and $D_{opt}$, and using these values, the curves shown in FIGS. 5 to 7 are plotted, thereby calculating the optimum values $P_{opt}$, $I_{opt}$ and $D_{opt}$. This function interpolation process has an advantage over the above method based on the optimum range that it is possible to obtain more optimum values.

A specific example of obtaining the optimum values of the

Figure 8:
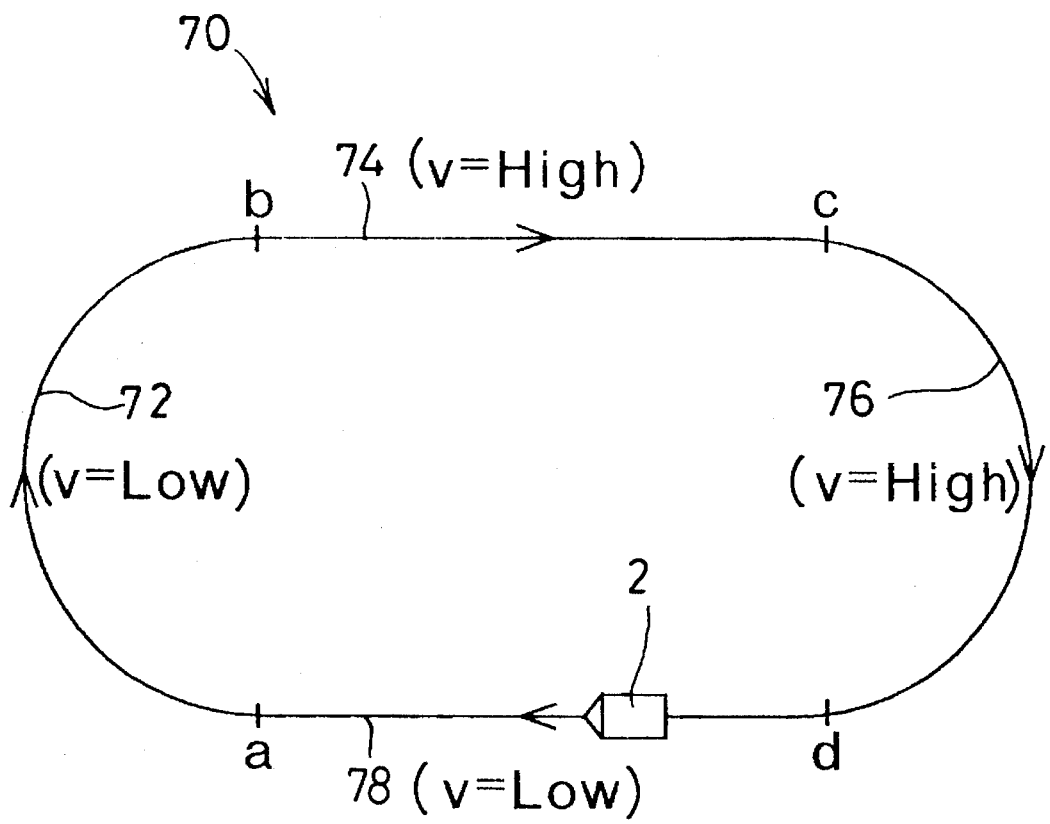
FIG. 8 is a plan view showing an automatic guidance vehicle running course in the method of determining feedback gain according to the first and the second embodiments.

P, I and D gains in the AGV running control by using the above evaluation functions will now be described with reference to FIG. 8. FIG. 8 is a plan view showing the running course of the AGV in this embodiment.

As shown in FIG. 8, the running course 70 of the AGV 2 in this embodiment is an oval closed loop consisting of four sections of different running conditions. In a section 72 of the course 70 from a point at a point b, the AGV 2 runs along a curve at low speeds. In a section 74 from the point b to a point c, it runs along a straight line at high speeds. In a section 76 from the point c to a point d, it runs along a curve at high speeds. In a section 78 from the point d to the point a, it runs along a straight line at low speeds.

Figure 9:
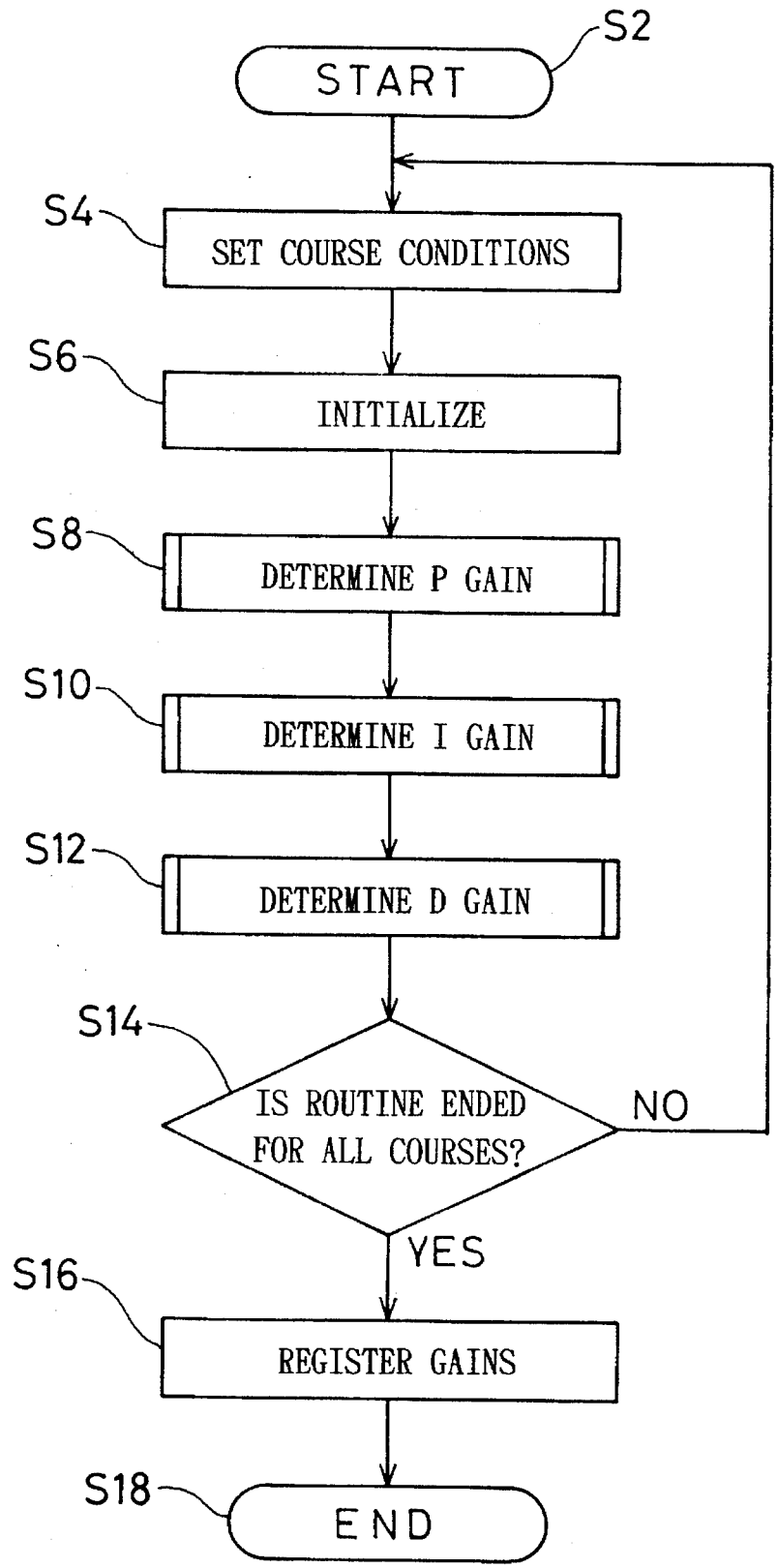
FIG. 9 is a flow chart showing a gain determination routine in the method of determining feedback gain according to the first embodiment.
Figure 10:
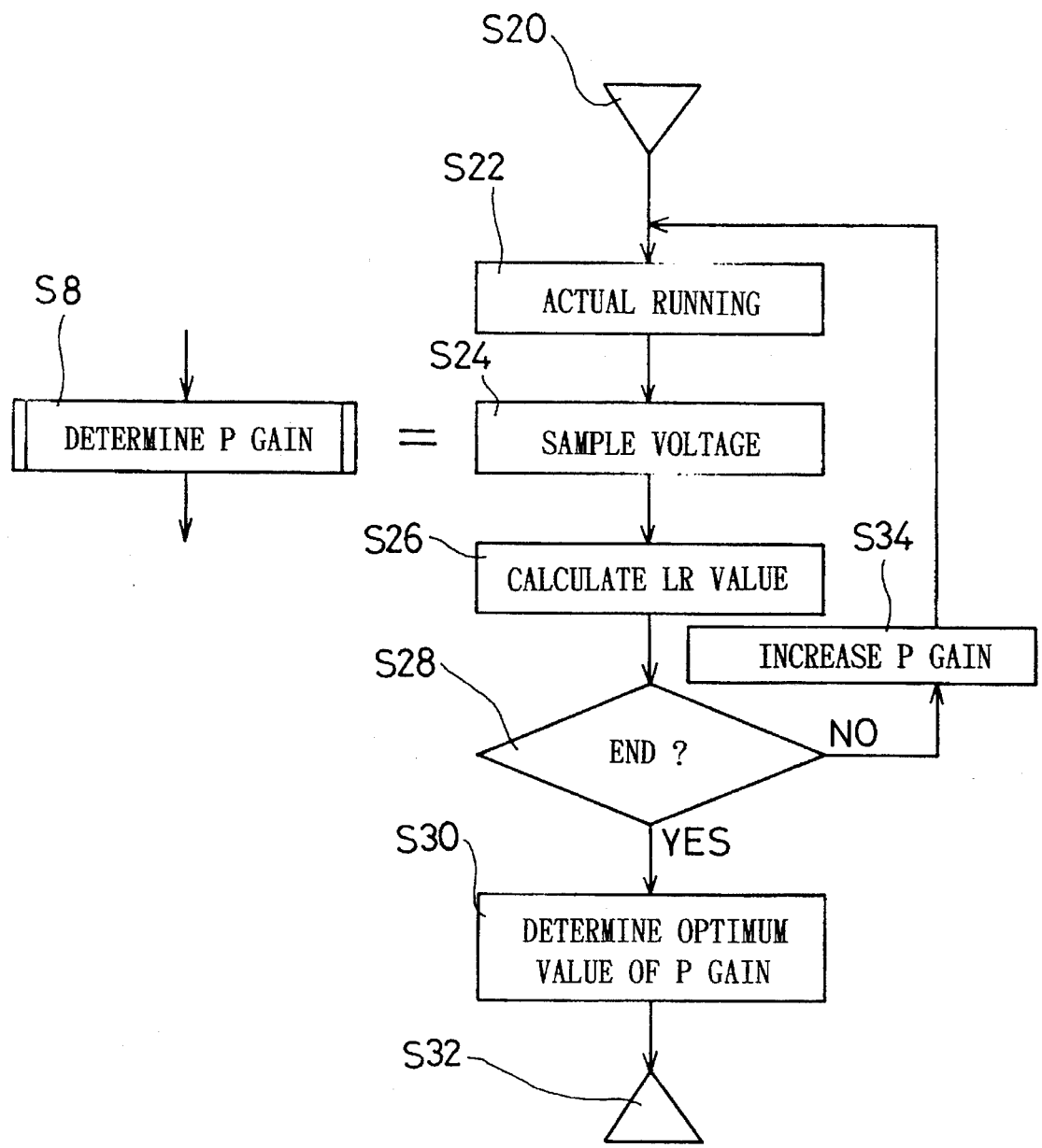
FIG. 10 is a flow chart showing part of the gain determination routine in the method of determining feedback gain according to the first embodiment.

In the running control for driving the AGV 2 along such running course 70, the procedure for determining the optimum values of the P, I and D gains will be described with reference to FIGS. 9 and 10. FIGS. 9 and 10 are flow charts illustrating the procedure of determining the P, I and D gains in this embodiment. The routine shown in these flow charts is executed in the central processor 10.

In this embodiment, data take-in and gain determination are done for each section of the running course shown in FIG. 8. For example, the AGV 2 is first driven repeatedly only in the section 72 for the data take-in, and first the P, I and D gains are determined for the section 72. Then, the AGV 2 is driven repeatedly only in the section 74 for the data take-in. Likewise, the AGV 2 is driven in the other sections. When the routine is started in Step S2, course conditions are set for either section (among the sections 72, 74, 76 and 78 in FIG. 8), for which the optimum values of the P, I and D gains are to be obtained (Step S4). Then, the values of the P, I and D gains are initialized (Step S6). That is, the individual gains are set to initial values which are preliminarily stored in the ROM 16 of the central processor 10 shown in FIG. 2. As each initial value, a sufficiently small value is set.

Subsequently, a process of obtaining the optimum value of the P gain is first executed (Step S8). The contents of the process or routine in Step S8 will now be described with reference to FIG. 10.

The routine is started in Step S20, and the AGV 2 is driven to run along the course 70 under feedback control using the initial values of the P, I and D gains that have been set in Step S6 in FIG. 9 (Step S22). Then, output voltage data from the lateral deviation detector 20 is taken into the central processor 10 (Step S24). The output voltage data is, for instance, $\epsilon(t)$ in FIG. 4, and by using this data, the value of the evaluation function LR for the P gain is calculated with the formula (1) in FIG. 4 (Step S26). Then, a check is made as to whether end conditions have been met by the value of LR (Step S28).

If the end conditions have been met, that is, if the value of LR is in the optimum value range shown in FIG. 5, the value of the P gain at this time is determined as the optimum value (Step S30). As a result, the routine goes back to the routine shown in FIG. 9 (Step S32). If the end conditions have not been met by the value of LR, the value of the P gain is increased by a predetermined amount (Step S34), and then Step S22 seq. are repeatedly executed.

When the routine shown in FIG. 9 is restored, Steps S10 and S12, i.e., a process of obtaining the optimum value of the I gain and a process of obtaining the optimum value of the D gain, are executed successively. These processes are similar to the process of obtaining the optimum value of the P gain shown in FIG. 10. Specifically, as for the I gain in Step S26 in FIG. 10, the value of the evaluation function Svv for the I gain is calculated with the formula (2) in FIG. 4. As for the D gain, in Step S26 in FIG. 10, the value of the evaluation function Asv for the D gain is calculated with the formula (3) in FIG. 4. If the values of Svv and Asv thus calculated are in the respective optimum value ranges shown in FIGS. 6 and 7, the values of the I and D gains at this time are determined as the optimum values.

The optimum value data of the three different gains are stored together with the course condition data set in Step S4 as a set of data in the RAM 14 of the central processor 10 in FIG. 2. Then, a check is made as to whether the processes have been ended for all the sections of the running course 70 (Step S14 in FIG. 9). If "YES", the data for all the course sections are registered (Step S16), and the routine is ended (Step S18). If the result of the check in Step S14 is "NO", the routine goes back to Step S4 to execute similar operations for the next course section. In this way, the optimum values of the P, I and D gains are determined.

In the routine of the flow charts of FIGS. 9 and 10, the value of each gain at the instant when the optimum value range shown in each of FIGS. 5 to 7 is entered is determined as the optimum value. However, as noted before, it is possible to obtain the individual gain optimum values ($P_{opt}$, $I_{opt}$ and $D_{opt}$ in FIGS. 5 to 7) by the function interpolation.

Figure 11A:
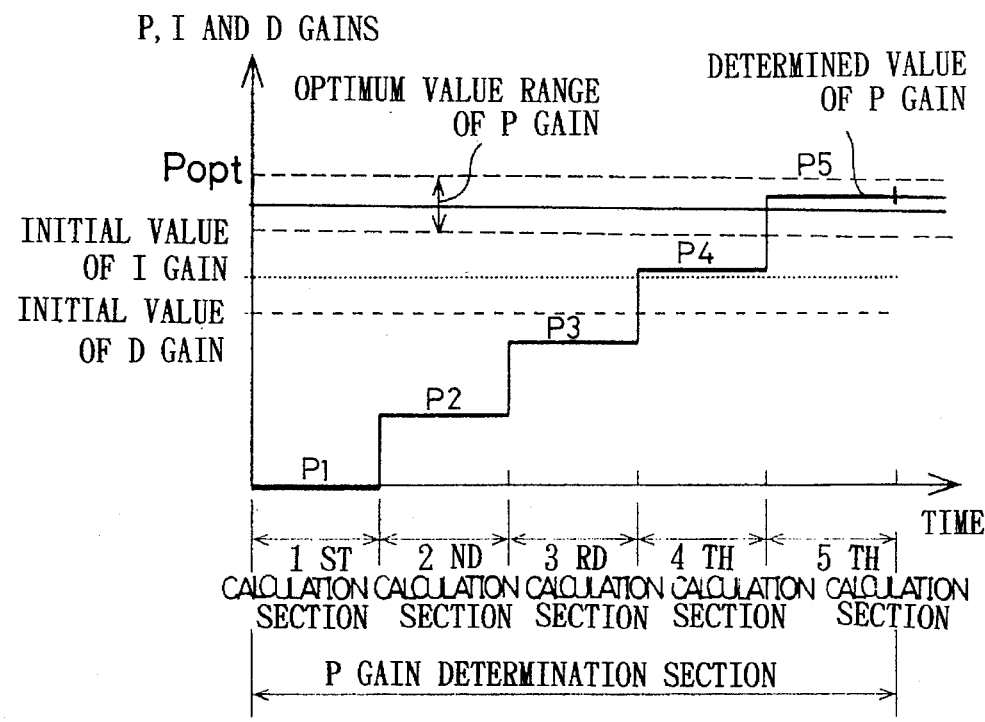
FIGS. 11(A) and 11(B) are graphs showing examples of gain determination process in the method of determining feedback gain according to the first embodiment.
Figure 11B:
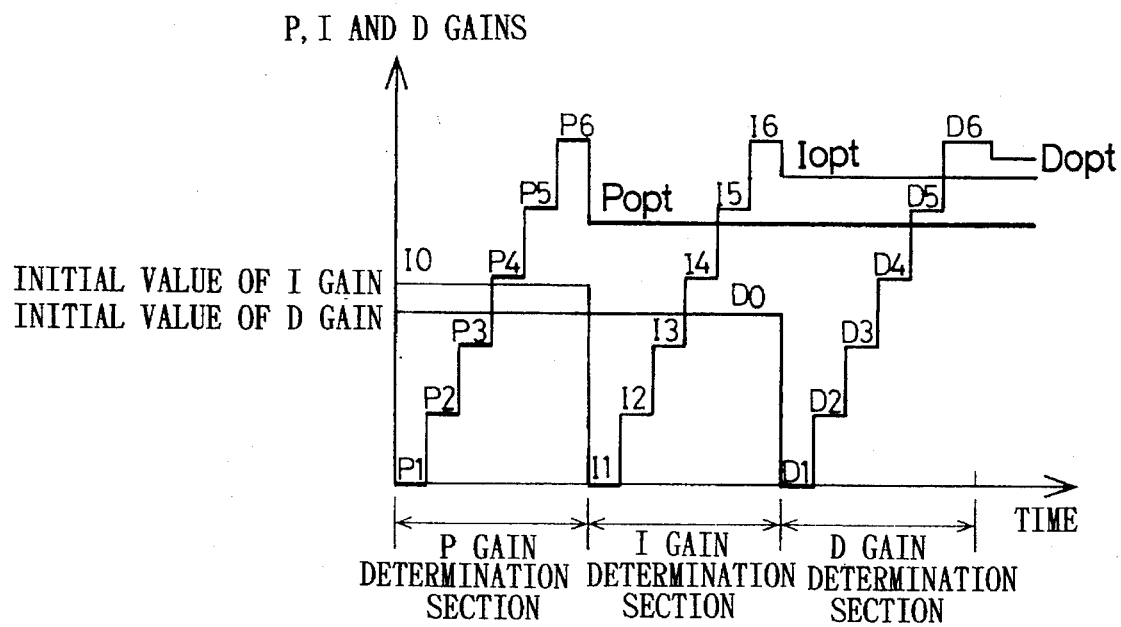

FIGS. 11(A) and 11(B) show specific examples of the P, I and D gains obtained in the above procedure.

FIG. 11(A) shows the process contents until the P gain is determined in the procedure shown in FIG. 10, and FIG. 11(B) shows the process contents until determination of each of the P, I and D gains by function interpolation. In the example of FIG. 11(A), the P gain is increased from initial value P1 and up to P5, at which the evaluation value enters the optimum value range. More specifically, the value of the P gain is increased progressively from its value in a first calculation section for data take-in and calculation, and its value when the evaluation value LR is calculated in a fifth calculation section is in the optimum value range shown in FIG. 5. The P gain value at this time is thus determined as the optimum value.

FIG. 11(B) shows the process of determining each of the P, I and D gains by function interpolation. First, the I and D gains are set to forecast optimum values I0 and D0, and in this state, the P gain is increased from initial value P1 in steps of a predetermined amount for taking output voltage data with actual running of the AGV and calculating the value of the evaluation function. When the minimum value is passed by the value of LR, the data take-in is stopped, and the optimum value Popt of the P gain is calculated by function interpolation with the values of LR that have been obtained. In the case of FIG. 11(A), the passage of the minimum value by the value of LR can be known at the instant when P gain value P6 is substituted, and the function interpolation is thus executed using the values of LR corresponding to the gain values P1 to P6, thus determining $P_{opt}$. Then, using the calculated value $P_{opt}$ and the value D0 the I gain is likewise increased from the initial value I1 in steps of a predetermined amount for calculating $I_{opt}$. Further, using the values $P_{opt}$ and $I_{opt}$, the value $D_{opt}$ is calculated likewise.

In either of the examples of FIGS. 11(A) and 11(B), the value of each gain is increased in steps of an equal amount. However, it is possible to change the amount of increase not only for each gain but also for each step.

Second Embodiment

A second embodiment of the invention will now be described with reference to FIGS. 2, 8, 10 and 12.

This embodiment, unlike the first embodiment, features that the P, I and D gains are determined by causing the AGV to run continuously along the running course. That is, the optimum P, I and D gains are determined for each of the sections 72, 74, 76 and 78 of the running course 70 shown in FIG. 8 while the AGV makes an excursion of the course.

The construction of the AGV, the constitution of the running control system and the running course are the same as in the first embodiment.

Figure 12:
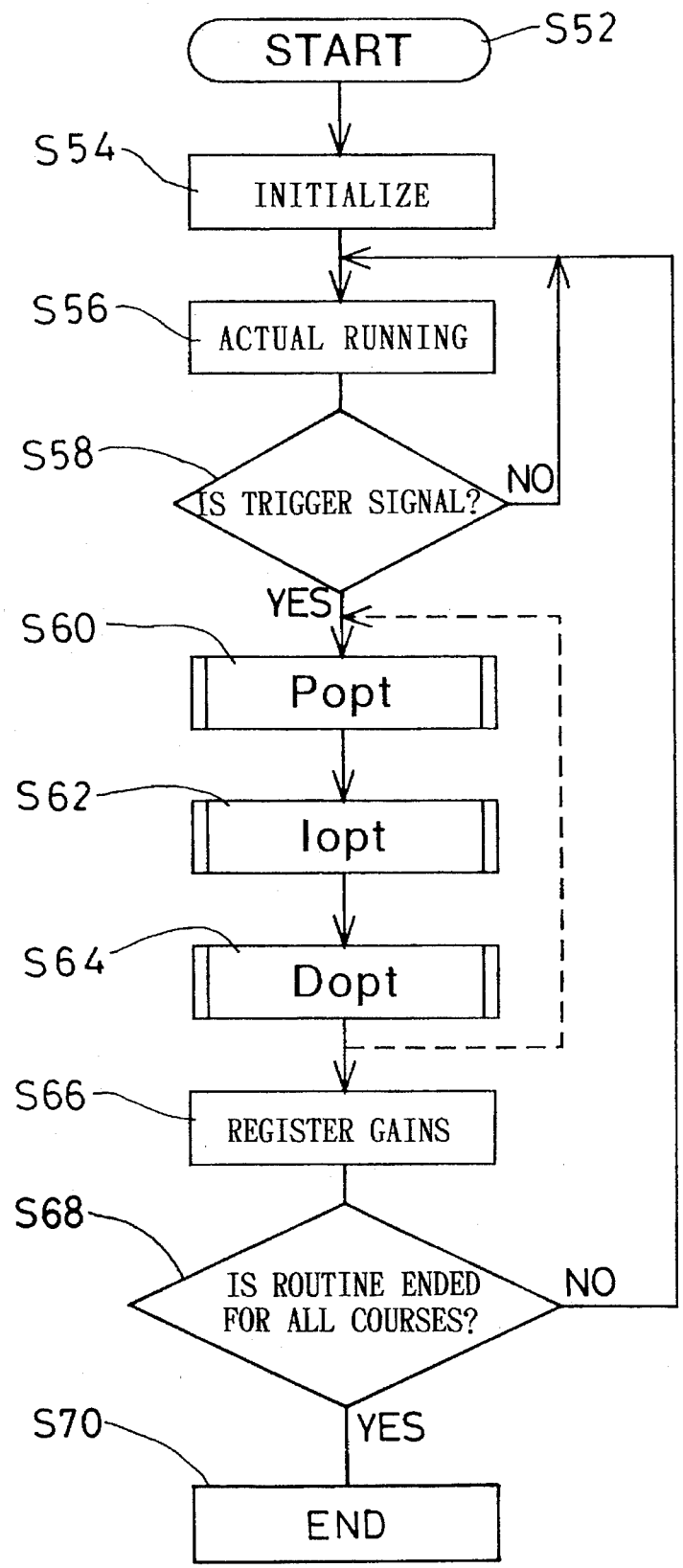
FIG. 12 is a flow chart showing a gain determination routine in the method of determining feedback gain according to the second embodiment.

The procedure in this embodiment will now be described with reference to FIG. 12. FIG. 12 is a flow chart illustrating the gain determination procedure in the feedback gain determination method of the second embodiment. The process illustrated in the flow chart is executed in the central processor 10 shown in FIG. 2.

When the routine is started in Step S52 in FIG. 12, the values of the P, I and D are initialized (Step S54). That is, the values of the individual gains are set to initial values which are preliminarily stored in the ROM16 of the central processor 10 in FIG. 2. Then, the AGV 2 is caused to run along the course 70 (Step S56). At each of the boundary points a to d between adjacent course sections, a marker is provided for transmitting a trigger signal, and a check is made as to whether a trigger signal from a marker has been inputted (Step S58). If the result of the check is "NO", the AGV is continually caused to run. Upon inputting of a trigger signal, the routine goes to Step S60, a process of obtaining the optimum value of the P gain. The process has the same contents as those in the first embodiment, and it is executed in the same way as the procedure shown in FIG. 10. Then, a process of obtaining the optimum value of the I gain (Step S62) and a process of obtaining the optimum value of the D gain (Step S64) are executed in succession.

Optimum value data which are thus obtained for the three different gains are registered together with data indicative of the course sections as a set of data in the RAM 14 of the central processor 10 shown in FIG. 2 (Step S66). The data indicative of the source sections are read in accordance with the previously inputted trigger signals. Then, a check is made as to whether the optimum values of all the P, I and D gains have been registered for all the sections of the running course 70 (Step S68). If the result of the check is "YES", the routine is ended (Step S70). Now, data which are necessary for the automatic running of the AGV 2 along the running course 70 are at hand, and it is possible for the AGV 2 to perform predetermined operations. If the result of the check in Step S68 is "NO", the routine returns to Step S56 for executing similar operations for the next course section.

As for the trigger signal inputting, instead of using the markers provided at the boundary points a to d, it is possible that the operator transmits a trigger signal by manual operation by watching the running AGV 2, or it is possible to adopt a system in which a trigger signal is outputted in the AGV 2 in accordance with the accumulated running distance.

There may be a case when the next trigger signal is inputted (for the next course section) before the routine concerning the three different gains have not yet been ended due to such causes as short time necessary for the AGV 2 to cover the present course section and stringent end conditions shown in Step S28 in FIG. 10. In such case, the end conditions shown in Step S28 in FIG. 10 may be made less stringent to obtain the optimum values of the three gains. If the next trigger signal has not yet been inputted in this stage, the end conditions in Step S28 in FIG. 10 may be made more stringent, and the routine may go back to Step S60 as shown by dashed line in FIG. 12 to obtain more suitable optimum value for each gain. As a further alternative, a gain which could have not been calculated until the reaching of the next course section by the AGV, may be calculated concurrently with the data take-in for the next course section.

In the flow chart shown in FIG. 12, the initial value of each gain set in Step S54 is used commonly for all the sections of the course as the initial value for the operation in Step S60 seq. By providing, between Steps S58 and S60, a step for inputting the initial value of each gain suited for each course section afresh in correspondence to the inputted trigger signal, it is possible to reduce the time necessary for the processing.

Each of the above embodiments has concerned with an example in which the P (proportional control), I (integral control) and D (differential control) gains are obtained as feedback gains. However, the invention is also applicable to cases of obtaining the optimum values of feedback gains other than the P, I and D gains. Further, while in the first embodiment, the optimum values are obtained in the order of that for the P gain, that for the I gain and that for the D gain, it is possible to obtain the optimum values in any order. Further, the evaluation functions for the gains in the above embodiments are by no means limitative, and it is possible to use other functions so long as they are suited for the gain evaluation. Furthermore, the construction of the AGV, other steps of the feedback gain determination method etc. in the above embodiments are by no means limitative.

While the invention has been described with reference to preferred embodiments thereof, it is to be understood that modifications or variations may be easily made without departing from the scope of the present invention which is defined by the appended claims.

What is claimed is:

1. A feedback control method comprising:

a first step of provisionally determining a predetermined value of a feedback gain;

a second step of executing feedback control by using the provisionally determined feedback gain;

a third step of detecting an error between a designated value and an actual value of the subject of control during the execution of said second step;

a fourth step of calculating a first evaluation value, a second evaluation value and a third evaluation value, said first evaluation value relating to stability of control, the second evaluation value relating to off-set error of control and the third evaluation value relating to a response control according to the error detected in said third step;

a fifth step of executing said second to fourth steps repeatedly a plurality of times after provisionally determining a new feedback gain value different from the previous value;

a sixth step of calculating a first feedback gain value for the proportional gain from the first evaluation value, calculating a second feedback gain value for the integral gain from the second evaluation value, and calculating a third feedback gain value for the differential gain from the third evaluation value which provides for a suitable evaluation value according to the relation between the feedback gain value and the evaluation value obtained through the execution of said fifth step; and a seventh step of executing a feedback control on the subject to be controlled by using the first, second and third feedback gain values obtained in the sixth step.

2. The feedback control method according to claim 1 for determining the optimum value of proportional gain, wherein:

in said fourth step, the ratio between the length of a curve of the error plotted against time axis and the length of the time axis is calculated as the evaluation value; and in said sixth step, the value of feedback gain providing for the minimum evaluation value is calculated, and the proportional gain is calculated.

3. The feedback control method according to claim 1 for determining the optimum value of integral value, wherein:

in said fourth step, the error is integrated to calculate the evaluation value; and in said sixth step, the value of feedback gain providing for the closest evaluation value to zero is calculated and the integral gain is calculated.

4. The feedback control method according to claim 1 for determining the optimum value of differential gain, wherein:

in said fourth step, the absolute value of the error is integrated to calculate the evaluation value; and in said sixth step, the value of feedback gain providing for the closest evaluation value to zero is calculated and the differential gain is calculated.

5. The method according to claim 1, further comprising after the sixth step and before the seventh step, the steps of:

calculating, a new first, second and third evaluation value using the calculated proportional, integral and differential gains; and verifying that the new first, second and third evaluation values are within an allowable range.

* * * * *

UNITED STATES PATENT AND TRADEMARK OFFICE
CERTIFICATE OF CORRECTION

PATENT NO. : 5,473,534
DATED : December 5, 1995
INVENTOR(S) : Shu7nji Miyahara

It is certified that error appears in the above-indentified patent and that said Letters Patent is hereby corrected as shown below:

| Column | Line | |
|---|---|---|
| 4 | 67 | After "error" delete "a". |
| 5 | 34 | After "necessary" insert --that--. |
| 5 | 36 | Change "to be in as" to --be as much in--. |
| 6 | 23 | After "value" delete ",". |
| 7 | 8 | After "point" change "at" to --a to--. |
| 8 | 54 | Change "DO" to --D0--. |
| 8 | 66 | Change "This" to --In this--; delete "features". |
| 8 | 67 | Delete "that". |
| 9 | 36 | Change "source" to --course--. |
| 10 | 11 | Change "has" to --is--. |
| 10 | 24 | After "method" insert --,--. |

Signed and Sealed this

Twenty-first Day of May, 1996

Attest:

BRUCE LEHMAN

*Attesting Officer*     *Commissioner of Patents and Trademarks*